Feb. 6, 1962 R. A. DAANE 3,019,903
FLUID FILTER MECHANISM
Filed April 13, 1959
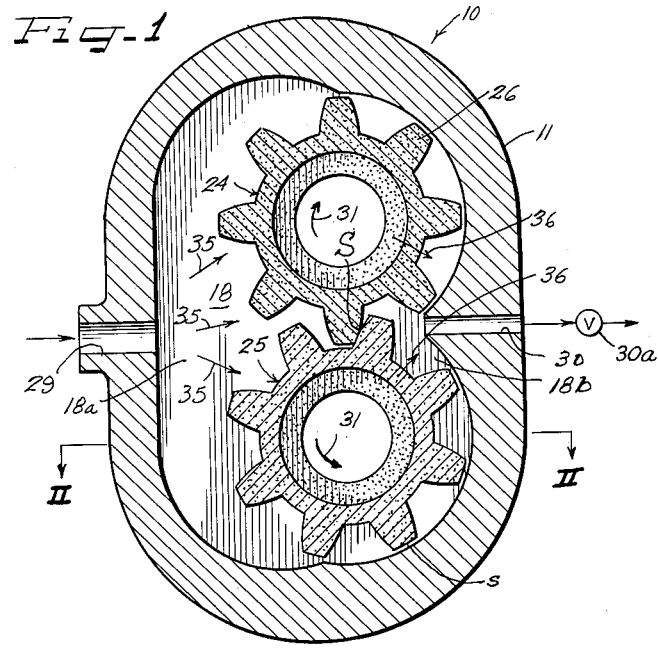
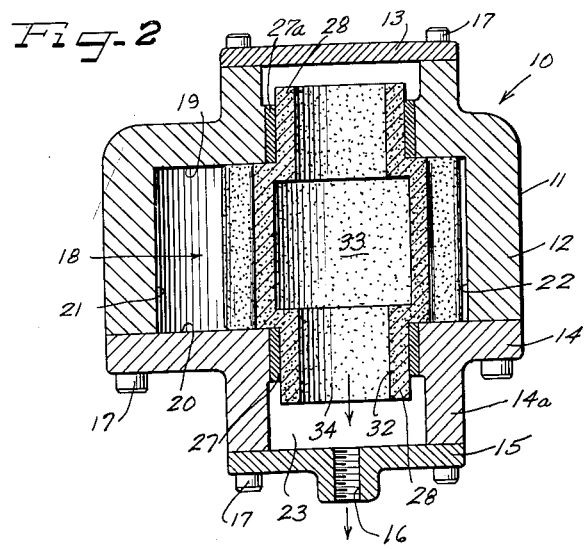
Inventor
Robert A. Daane
by Hill, Sherman, Meroni, Gross & Simpson Attys.

United States Patent Office 3,019,903
Patented Feb. 6, 1962

3,019,903
FLUID FILTER MECHANISM
Robert A. Daane, Beloit, Wis., assignor to Beloit Iron Works, Beloit, Wis., a corporation of Wisconsin
Filed Apr. 13, 1959, Ser. No. 806,009
7 Claims. (Cl. 210—108)

The present invention relates broadly to the art of fluid filtration, and is more particularly concerned with the new and improved filter mechanism for continuously cleansing pressurized fluids and featuring in part the provision of fluid driven porous filtering members backwashed by controlled pressure differentials within the filter mechanism.

It is a primary aim of the present invention to provide a new and improved continuous flow filter particularly well adapted for the filtration of fluids at relatively high pressures, and which additionally is of substantial utility in connection with lubricating and fuel oil systems and related applications requiring removal of contaminants from a pressurized fluid flow.

Another object of the invention lies in the provision of filtering apparatus embodying therein porous rotor elements driven by contaminated fluid introduced into the apparatus, the rotor elements effectively removing contaminants from the fluid and maintained essentially cleansed by a backward fluid flow therethrough.

A further object of this invention is to provide a fluid filter mechanism, comprising a housing having a filter chamber therein and passaged to provide a contaminated fluid inlet, a cleansed fluid outlet and a backwash outlet in communication with said chamber, and a plurality of porous hollow members in sealing contact one with the other mounted in the filter chamber and rotatable under action of the contaminated fluid flow from the inlet to remove from said flow contaminants and passing cleansed fluid through the cleansed fluid outlet and contaminants into the backwash outlet.

Other objects and advantages of the present invention will become more apparent during the course of the following description, particularly when taken in connection with the accompanying drawings.

In the drawings, wherein like numerals are employed to designate like parts throughout the same:

FIGURE 1 is a sectional view of filter apparatus constructed in accordance with this invention; and FIGURE 2 is a horizontal sectional view taken substantially along the line II—II of FIGURE 1.

Referring now to the drawings, there is provided by the present invention a fluid filter mechanism designated generally by the numeral 10 and comprising a housing or casing 11 formed in the embodiment shown with a main body portion 12 closed at one end by a plate member 13 and at its opposite end by a cover member 14 to which is secured a plate member 15 apertured at 16 to provide a cleansed fluid outlet. The parts described may be secured in various ways, and by way of illustration bolt means 17 are utilized.

The main body portion 12 and cover member 14 of the housing 11 define interiorly a filter chamber 18, the longitudinal extent of which is defined by end surface 19 of the body portion 12 and end surface 20 of the cover member 14. The transverse extent of the filter chamber 18 is defined, on the other hand, by side surfaces 21 and 22 of the body portion 12. The filter chamber 18 communicates with the cleansed fluid outlet 16 in the manner now to be described through a cleansed fluid chamber 23 provided by an annular collar portion 14a on the cover member 14 of the housing 11.

To effectively continuously remove contaminants from a pressurized fluid flow, there is supported interiorly of the housing 11 a pair of vertically aligned and longitudinally extending rotor elements generally designated by the numerals 24 and 25. The rotor elements or filtering members 24 and 25 are formed of a porous material having a porosity chosen to suit the fluid to be filtered and the pressure drop permissible. Exemplary materials for this purpose are unglazed ceramic, sintered bronze, agricola metal and related porous substances. Each rotor element 24 and 25 presents the configuration of a fluid pump gear having a plurality of relatively coarse circumferentially spaced teeth 26 formed thereon generally centrally and inwardly of opposite ends of each rotor element. The rotor elements are supported at opposite ends by annular bearing and seal elements 27 and 27a received by the housing body portion 12 and cover member 14, respectively, and surrounding reduced diameter journal portions 28 on each rotor element 24 and 25.

It may be seen from FIGURE 2 that the teeth 26 on each rotor element 24 and 25 are in close running relation or sealing contact with end surface 19 on the housing body portion 12 and the end surface 20 on the cover member 14, these surfaces defining the longitudinal extent of the filter chamber 18. Further, as is also seen in FIGURE 1, the teeth 26 on the elements 24 and 25 are in close clearance relation with side surface 22 of the housing body portion 12, the side surface 22 being smoothly curved so that essentially the same spacing s is maintained between the teeth 26 during travel along the surface 22. Substantial fluid flow is accordingly prevented through the spaces s. In addition, it will be noted from the drawings that the rotor elements 24 and 25 are spaced relatively more closely to the side surface 22 than to the side surface 21 of the housing body portion 12, providing a substantial fluid flow area of the filter chamber 18 for contaminated fluid introduced therein.

The body portion 12 of the housing 11 is passaged along one side as indicated in FIGURE 1 by the numeral 29 to provide a contaminated fluid inlet, and generally in horizontal alignment therewith a relatively lesser diameter opening 30 is provided in the opposite side of the body portion 12, the opening 30 providing a backwash outlet. It is to be observed from FIGURE 1 that contaminated fluid introduced through the inlet 29 applies a torque to the rotor elements 24 and 25 to rotate said elements in a direction indicated by the arrows 31, whereupon one tooth 26 of the rotor 24 meshes with or contacts a tooth 26 on the rotor 25 to provide a seal S preventing flow of contaminated fluid from the inlet 29 to the outlet 30.

In accordance with the present invention, each rotor element 24 and 25 is hollow, and as shown in FIGURE 2, is provided with a stepped bore 32 extending therethrough to create interiorly of each element a chamber 33 receiving the cleansed fluid from which contaminants are removed by said elements and a cleansed fluid passage 34 communicating with the chamber 23 defined by the collar portion 14a on the cover member 14 and the plate member 15 secured thereto.

Contaminated lubricating or fuel oil or other fluid medium from which foreign substances must be removed while the liquid is maintained or flows under pressure is directed into the filtering assembly 10 through the inlet 29 in the body portion 12 of the housing 11. The pressurized fluid upon being introduced through the inlet 29 enters area 18a of the filter chamber 18 radially outwardly of the rotor elements 24 and 25, and flows under substantial pressure toward said elements in generally the directions indicated by the arrows 35. The contaminated fluid is forced under pressure into the rotor elements 24 and 25, the foreign materials therein being blocked or removed by the relatively fine pores in the rotor structures and the fluid free of contaminants passed through the structures and into the chambers 33 interiorly thereof. As mentioned previously, contaminated fluid proceeding in generally the direction of the arrows 35 is prevented from pursuing any course other than through the rotor elements 24 and 25 by provision of the seal S between said elements as rotation thereof occurs and the teeth 26 mesh in the manner of FIGURE 1.

Clear or cleansed fluid flows from the chamber 33 through the pasage 34 into the chamber 23 and through the filtrate outlet 16. For continuous back washing service, the pressure within the outlet 16 is preferably approximately intermediate between the pressure of the fluid entering the contaminated fluid inlet 29 and the pressure to which the backwash is delivered through the outlet 30. By reason of this pressure differential, a fluid flow occurs in a reverse or radial outward direction from the chamber 33 in generally the direction shown by the arrows 36. This reverse flow or backwash through the porous rotors 24 and 25 has the highly desirable and important effect of continuously cleansing the exterior surfaces of the rotor elements 24 and 25 of foreign materials or contaminants removed from the contaminated fluid and prevented from passage into the chamber 33. Since the teeth 26 on each rotor 24 and 25 rotate in close adjacency to the curved surface 22 of the housing body portion 12, and the seal S is provided by contact of the teeth 26 on the rotor elements 24 and 25, the filter chamber 18 is essentially divided into two sub-chambers or compartments, these being the introduction compartment 18a and the backwash compartment 18b. Accordingly, the compartment 18a is substantially at all times filled with moving contaminated fluid directed under pressure toward the rotors 24 and 25 in the directions indicated by the arrows 35, and the compartment 18b contains essentially therein a moving fluid body having a relatively high concentration of contaminants removed from the outer diameters or exteriors of the rotors 24 and 25 by the reverse flow action described and designated by the arrows 36. While the quantity of fluid discharged into the compartment 18b will vary in accordance with the nature of the particular fluid being filtered, the degree of porosity of the rotors 24 and 25, and other factors, it has been calculated that approximately 0.5 to 15% of the volume of fluid entering the compartment 18a will flow into the compartment 18b and outwardly from the filtering assembly 10 through the backwash outlet 30 in the housing body portion 12. In this manner, the rotatable filtering elements 24 and 25 are continuously maintained essentially free of contaminants or foreign materials upon their outer diameters, and thereby the elements present to the contaminated fluid in the compartment 18a a relatively clean surface for further and continuous effective filtering action.

An important feature of the instant invention is operability entirely within a pressurized housing without any opening for mechanical shaft means or other means for transmitting mechanical work into the housing. Thereby the difficulties associated with sealing means are avoided.

An additional advantage is that the filter mechanism 10 may be operated on a continuous backwash basis or the outlet 30 may be blocked by a manual or automatic valve 30a. In the latter case backwash may take place at intervals as needed. By such an arrangement the device would also be useful for small heating or motor units using light oils or gasoline for fuel. With this arrangement the rotation of the gear elements 24 and 25 would take place only when the backwash valve 30 is open.

It is to be observed from the drawings that in the exemplary embodiment of the invention shown, the cleansed fluid outlet 16 is in alignment with the axis of rotation of each of the elements 24 and 25, and that the contaminated fluid inlet 29 and backwash outlet 30 are generally transverse thereto. Other fluid flow patterns could of course be utilized, and in addition, more than a pair of rotor elements 24 and 25 can be employed. While particularly satisfactory results are obtained when the rotors are constructed of porus ceramic or metallic materials, other substances may be used having the desired degree of porosity in accordance with the nature of the fluid being treated and the pressure drop from the contaminated fluid inlet 29 and backwash outlet 30. It will thus be appreciated that various modifications may be made in the illustrative embodiment of the invention shown without departing from the novel concepts of the present invention.

As set forth in detail above, in operation, fluid to be filtered is directed into the inlet portions 18 of the chamber within the housing at a pressure $P_1$, as supplied to the filter.

The gear like members, 24 and 25, prevent free flow to the outlet portions of the chamber, and thus a pressure difference is available, the resulting pressure within the outlet portion being $P_2$. This pressure difference causes the gear members, 24 and 25, to rotate. A small amount of fluid is carried by the gear tooth spaces from inlet to outlet during rotation of the gear members.

The filtered fluid which flows radially inwardly through the gear members from the inlet chamber portion 18 enters a cleansed fluid chamber 23 and is at an intermediate pressure $P_3$ which is less than $P_1$ and greater than $P_2$.

It is, of course, obvious that the pressure, $P_1$, will be provided by the system to which a filter is applied, and as with any filter of the prior art, a pressure difference must be provided to cause flow through the filtering medium. Those skilled in the art will perceive that the intermediate pressure $P_3$, within the cleansed fluid chamber 23, may be provided by any of the usual ways, for example, by elevating the container to which cleansed fluid would be delivered.

The mechanism will be placed into a system wherein factors are present which will provide an inlet pressure $P_1$, a pressure $P_2$ which is relatively lower than $P_1$ rotating the gear members, and a pressure $P_3$ which is intermediate $P_1$ and $P_2$ and causes filtering flow and backwash flow through the perforate gear members. Also, as above stated, the pressure differential between $P_2$ and $P_3$ can be controllably changed, such as by placing a valve in the outlet opening 30.

I claim as my invention:

1. A filter assembly for cleansing pressurized liquids continuously delivered thereto, comprising a housing defining a filter chamber interiorly thereof and provided with a contaminated fluid inlet and outlets for the passage of filtrate and contaminants, and a plurality of toothed meshing passaged porous filtering elements and means within the housing mounting said elements for counter-rotation and sealing the inlet from the filtrate outlet, the elements during said counter-rotation being in sealing meshing engagement to divide the filter chamber into a contaminated fluid compartment and a contaminant compartment and being in close relation with the surfaces of the latter compartment to prevent substantial fluid flow from said compartment to the contaminated fluid compartment, the contaminated fluid under pressure contacting the counter-rotating elements and filtrate removed therefrom passing through the passages in said elements to the filtrate outlet, the inlet and outlets being so sized that a pressure drop occurs from the filtrate outlet to the contaminant outlet to cause reverse fluid flow from the interior of the elements to said centaminate outlet to continuously backwash contaminant thereto.

2. A fluid filter comprising a housing having a filter chamber therein with a plurality of toothed porous meshing hollow gear members rotatably mounted to divide said chamber into a high pressure inlet chamber and a low pressure outlet chamber, and an intermediate pressure chamber communicating with the interior of the hollow gear members so that fluid will filter through the gear members from the high pressure chamber to the intermediate pressure chamber and fluid will backwash through the gear members from the intermediate pressure chamber to the low pressure chamber, the action of the pressure differential between said inlet chamber and said outlet chamber on the faces of the gear teeth causing rotation of the gear members.

3. A fluid filter comprising a housing having a filter chamber therein, a plurality of toothed hollow pervious gear members corotatably mounted to divide said chamber into an inlet chamber and an outlet chamber, said outlet chamber operating at a pressure lower than said inlet chamber and said gear members passing fluid from the inlet chamber to the outlet chamber with rotation, and a cleansed fluid chamber in the housing communicating with the interior of the hollow gear members being at a pressure less than the inlet chamber so that fluid will filter through the gear members, and being at a pressure greater than the outlet chamber for at least a portion of the operation so that fluid will flow from the cleansed fluid chamber to the outlet chamber for cleaning the gear members, the action of the pressure differential between said inlet chamber and said outlet chamber on the faces of the gear teeth causing rotation of the gear members.

4. A fluid filter comprising a housing having a filter chamber therein, a plurality of toothed meshing hollow gear members of a porous filter material rotatably mounted to divide said chamber into a high pressure inlet chamber and a low pressure outlet chamber, and an intermediate pressure chamber communicating with the interior of the hollow gear members, said filter material having a porosity to cause a pressure drop in the fluid from the inlet chamber to the intermediate pressure chamber with said intermediate pressure chamber being at a pressure between the fluid pressures in said inlet and outlet chambers, the action of the pressure differential between said inlet chamber and said outlet chamber on the faces of the gear teeth causing rotation of the gear members.

5. A fluid filter comprising a housing having a filter chamber therein, a plurality of toothed porous meshing hollow gear members rotatably mounted to divide said chamber into a high pressure inlet chamber and a low pressure outlet chamber, an intermediate pressure chamber in the housing communicating with the interior of the hollow gear members so that fluid will filter through the gear members from the high pressure chamber to the intermediate pressure chamber and fluid will backwash through the gear members from the intermediate pressure chamber to the low pressure chamber, and valve means connected downstream from said low pressure outlet chamber for blocking the flow of liquid from the outlet chamber and increasing the pressure in said low pressure outlet chamber, the action of the pressure differential between said inlet chamber and said outlet chamber on the faces of the gear teeth causing rotation of the gear members.

6. A fluid filter comprising a housing having a filter chamber therein, a plurality of toothed hollow pervious gear members corotatably mounted to divide said chamber into an inlet chamber portion and an outlet chamber portion, said outlet chamber operating at a pressure lower than said inlet chamber so that the gear members will be driven in rotation, and a cleansed fluid chamber in the housing communicating with the interior of the hollow gear members and operating at a pressure intermediate the pressures of said inlet and outlet chambers so that fluid will filter through the gear members from the inlet chamber to the cleansed fluid chamber and will backwash from the cleansed fluid chamber to the outlet chamber, the action of the pressure differential between said inlet chamber and said outlet chamber on the faces of the gear teeth causing rotation of the gear members.

7. A fluid filter comprising a housing having a filter chamber therein, a plurality of toothed porous meshing hollow gear members rotatably mounted to divide said chamber into a high pressure inlet chamber and a low pressure outlet chamber, an intermediate pressure chamber in the housing communicating with the interior of the hollow gear members so that fluid will filter through the gear members from the high pressure chamber to the intermediate pressure chamber and fluid will backwash through the gear members from the intermediate pressure chamber to the low pressure chamber, and means for controlling the flow of fluid from the housing for controlling the pressure differential between the intermediate chamber and the outlet chamber, the action of the pressure differential between said inlet chamber and said outlet chamber on the faces of the gear teeth causing rotation of the gear members.

References Cited in the file of this patent
UNITED STATES PATENTS

| | | |
|---|---|---|
| 776,801 | Rood | Dec. 6, 1904 |
| 784,170 | Miller | Mar. 7, 1905 |
| 1,950,466 | Wille et al. | Mar. 13, 1934 |
| 2,243,585 | Towler et al. | May 27, 1941 |
| 2,615,456 | Galusha | Oct. 28, 1952 |
| 2,663,429 | Bossard | Dec. 22, 1953 |